Sept. 15, 1936.     J. E. COLEGROVE     2,054,739
ICE CREAM MAKING PAN
Filed Jan. 16, 1936          3 Sheets-Sheet 1
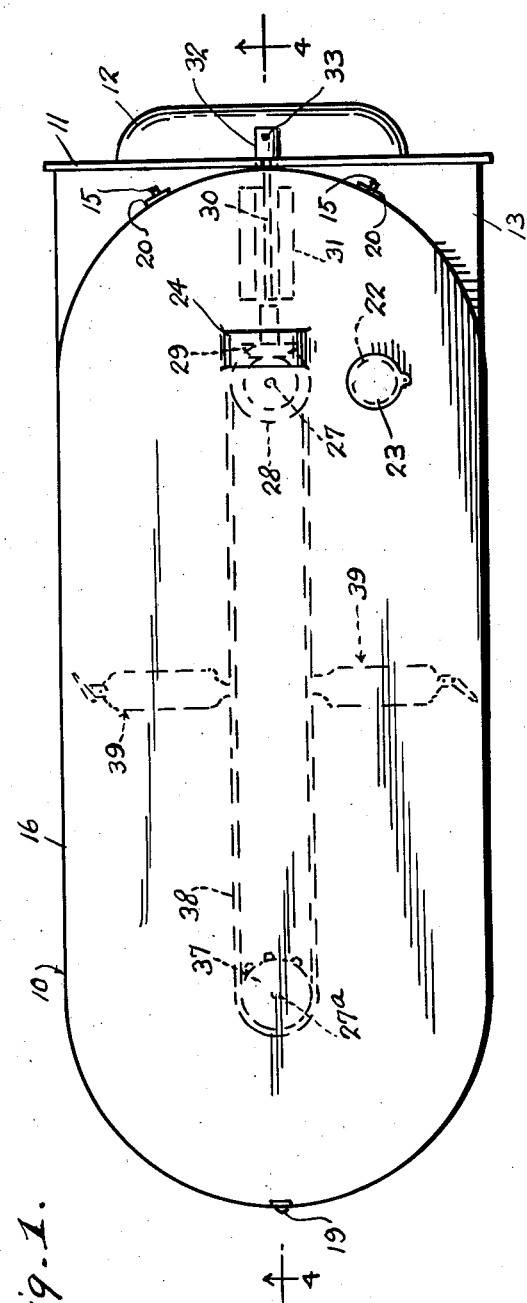
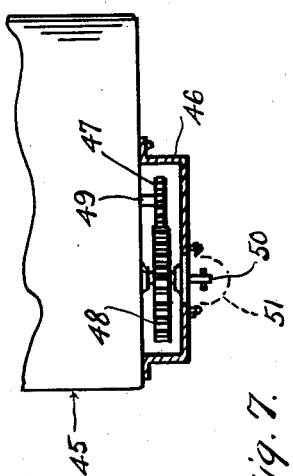
Inventor
J. E. Colegrove
By Clarence A. O'Brien and
Hyman Berman
Attorneys

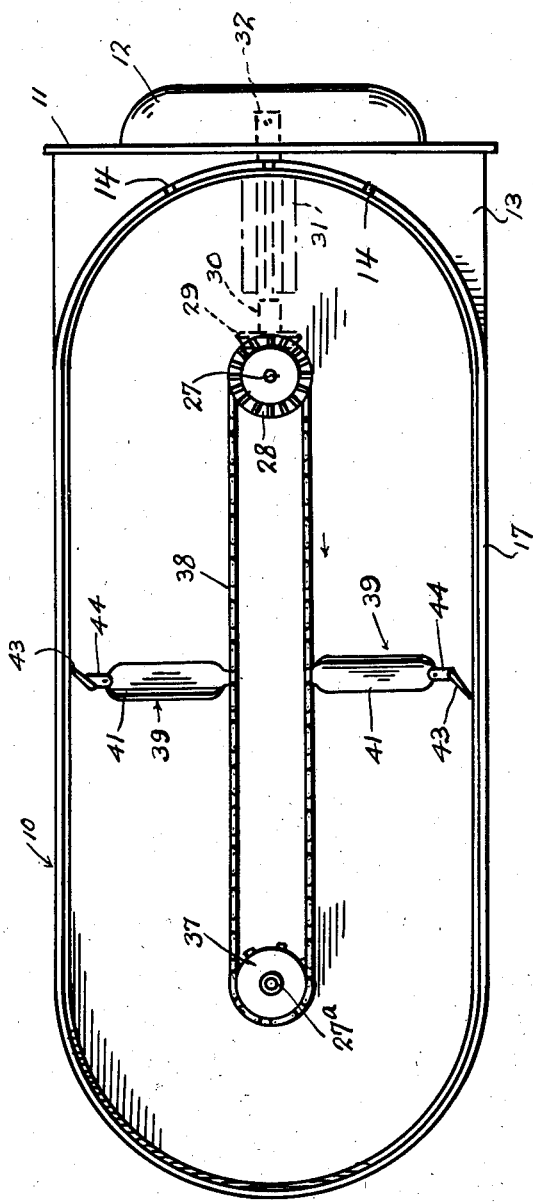
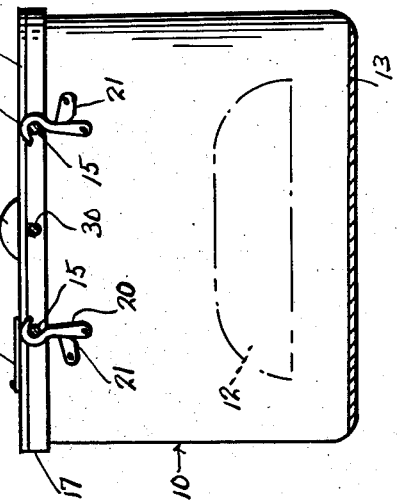

Sept. 15, 1936.  J. E. COLEGROVE  2,054,739
ICE CREAM MAKING PAN
Filed Jan. 16, 1936   3 Sheets-Sheet 3
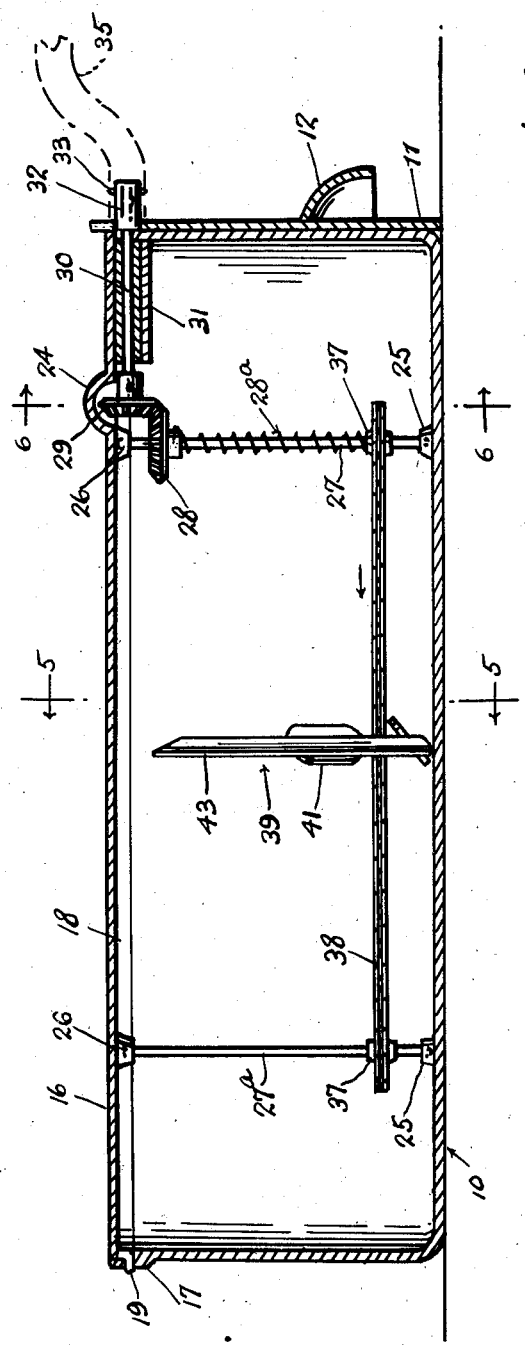
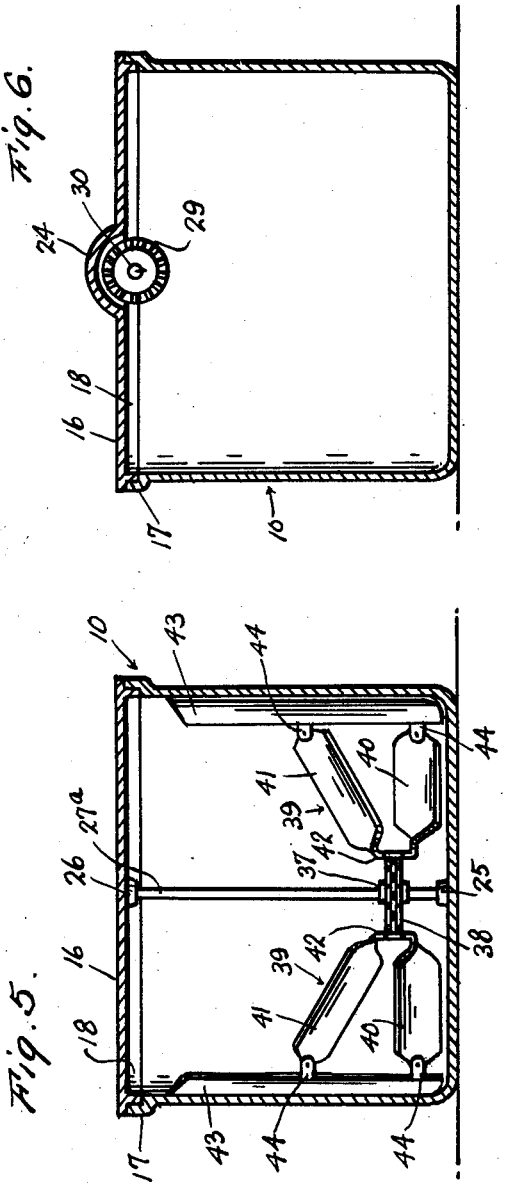
Inventor
J. E. Colegrove
By Clarence A. O'Brien and
Hyman Berman   Attorneys Patented Sept. 15, 1936

2,054,739

UNITED STATES PATENT OFFICE 2,054,739

ICE CREAM MAKING PAN

James E. Colegrove, Pyote, Tex.

Application January 16, 1936, Serial No. 59,463

6 Claims. (Cl. 259—102)

This invention relates to that classification known as domestic or home appliances and has more specific reference to an accessory susceptible of use in present day mechanical refrigerators, said accessory being in the nature of an especially constructed pan for making frozen delicacies and confections, particularly ice cream and water ices.

The special line of endeavor to which the invention relates embodies different types of pans and trays designed for the same purpose and it is, therefore, my chief aim, to structurally improve upon these known prior art devices by providing one possessed of appreciable refinements and improvements designed to permit the desired results to be attained in a more dependable, economical and satisfactory manner.

As is implied by the preceding paragraphs, I am sufficiently conversant with the state of the prior art and trade to recognize that a substitute tray for disposition in a conventional freezing rack is not new. Moreover, it is admittedly old to incorporate in such trays various forms of mixing, agitating and dasher means. Furthermore, it is recognized that the broad proposition of transmitting motion from an electric motor to the dasher means in the substitute tray is not distinctively new.

Notwithstanding the seemingly well developed state of the art, I have succeeded in developing what I believe to be a comparatively novel structure in that it is possessed of specific adaptations and distinguishable and novel factors to accomplish the desired results in a more practicable and reliable manner.

In reducing to practice my novel contribution to the art, I utilize a substantially round ended or oval type receptacle having especially designed dasher means therein, the dasher means being of the planetary type, whereby to provide for more effective and rapid stirring of the contents of the pan.

Other structural features and advantages will become more readily apparent from the following description and drawings. In the accompanying drawings wherein like numerals are employed to designate corresponding parts throughout the various views:

Figure 1 is a top plan view of the ice cream making pan or device constructed in accordance with the principles of the present invention.

Figure 2 is a top plan view with the special lid or cover removed to show the internal dasher mechanism.

Figure 3 is a transverse section through the frontal portion of the pan, that is inwardly of the face plate or panel designed to show the lid retention hooks or latches.

Figure 4 is a central longitudinal sectional view taken approximately on the plane of the line 4—4 of Figure 1.

Figures 5 and 6 are transverse or cross sectional views taken on the planes of the lines 5—5 and 6—6 respectively of Figure 4.

Figure 7 is a fragmentary view partly in section and partly in elevation showing the power take-off attachment for the motor power.

Figure 8 is a section through the front portion of the lid or cover.

Figure 9 is a detail view of the flexible drive shaft used between the motor and the power transmission means of the dasher structure.

By way of introduction to the detailed description, it is to be understood that the invention is intended to be used in so-called mechanical refrigerators of the power operated type. In most of these refrigerators special racks are provided to accommodate pans and trays in which ice cubes are made for home use. The present invention has to do with a pan or tray which is approximately the same size as those ordinarily used. Hence, it is a substitue tray used when it is desired to manufacture frozen confections such as sherbet, ice cream, custard and the like.

In the drawings, the pan as a unit is denoted by the numeral 10. It is substantially oval in top plan view so as to permit the internal dasher mechanism to travel in an orbital path to insure effective and uniform agitating results. At the front of the pan is a closing plate or panel 11 having an appropriate hand-grip 12. This closing plate or panel may be attached to the frontal portion of the pan by a connective web 13. This will provide the desired space between the plate and pan front to accommodate the retaining studs or pins carried by the front end of the lid 16. This lid, as is obvious, corresponds in shape to the pan and the stud extends through and beyond shallow notches or keeper seats in the rounded front wall of the pan.

The upper edge of the rim of the pan is provided with an adapter channel 17 to accommodate the marginal depending flange 18 on the lid. Moreover, at the rear or inner end there is a retention hook 19 on the lid which goes through a keeper hole in the adjacent portion of the rim of the pan. This serves to keep the lid firmly in place at one end. The aforesaid outstanding studs or pins 15, fitting into suitable keeper notches 14 in the rim, serve to hold down the opposite end. In this connection attention is invited to Figure 3 wherein it will be observed that on the front wall of the pan I provide a pair of pivoted hooks 20 and these engage over the studs to hold the studs in place. The hooks are in turn held in engagement with the pins by safety clips 21. The numeral 22 in Figure 1 designates a sight opening sometimes referred to as a peep-hole, this having a closing lid 23 associated therewith. Moreover the lid adjacent this peep-hole is formed with a raised portion 24 to accommodate the gearing.

Calling attention now to Figure 4 it will be observed that the bottom of the pan is provided with longitudinally spaced bearing sockets 25 located beneath corresponding sockets 26 on the under side of the lid. These sockets serve to accommodate and permit free rotation of the front and rear shafts 27 and 27ª of the dasher mechanism. Incidentally, the shaft 27 may be conveniently distinguished as the driven shaft and is provided with a beveled gear 28 in mesh with a pinion 29 on the power supply or transmission shaft 30. This shaft is mounted in an appropriate bearing 31 on the under side of the frontal portion of the lid or cover. The shaft extends beyond the front plate where it is formed with a suitable coupling 32 having clutch pins 33 to accommodate a coupling 34 on one end of the flexible power transmission shaft 35 (see Figure 9). The opposite end of the shaft is also provided with a similar coupling 36 which serves in a manner to be hereinafter described.

It is to be noted that the shaft is provided with appropriate sprocket wheels 37 to accommodate an endless sprocket chain 38. The sprocket chain is provided with a pair of duplicate dasher or agitating units 39. Each unit is of triple blade construction. That is to say the construction includes a lower horizontally disposed agitating fin or blade 40 and a companion upwardly and outwardly inclined blade 41. These are joined together by a connecting member 42 fastened to the sprocket chain. The blades 40 and 41 are pitched or angled properly to provide for the desired stirring action. The vertical paddles are denoted by the numerals 43 and these are pivotally attached as indicated at the points 44 to the outer ends of the complemental blades 40 and 41. The paddles are also inclined or pitched in the direction of rotation or travel of the units 39. The paddles 43 are in a sense scraping blades and are spaced away from the wall of the pan so as not to drag on the wall but to contact it lightly to allow unobstructed travel in the predetermined orbital path of movement. Those units on the flexible chain obviously move around in a path which corresponds to the contour of the rim of the pan.

Referring to Figure 7 the numeral 45 designates an electric motor. This may be the regular motor built into the refrigerator (not shown) since said motor will frequently serve as the source of motive power. A protector housing 46 surrounds the fibre gears 47 and 48, the gear 47 being on the motor shaft 49 and the gear 48 on the power take-off shaft 50. This shaft has suitable coupling means to accommodate the coupling head 36 on the flexible power transmission shaft 35. The numeral 51 merely designates a suitable detachable protector cap which goes over the fitting 50 when the invention is not in use. In some instances instead of using motor power it is obvious that a hand crank (not shown) may be utilized to drive the dasher means in the pan.

In operation it is evident that when the shaft 30 is set into rotation, the gearing 29 and 28 serves to simultaneously rotate the two shafts 27 and 27a. These shafts in turn drive the endless chain and the agitator or dasher units 39 operatively connected thereto. The dasher units travel around in the liquid mass and serve to properly agitate it while it is allowed to freeze in the refrigerator rack (not shown). It is believed, therefore, that a pan equipped with these special adaptations provides a more satisfactory and dependable means for making smooth and delicious ice cream and similar frozen desserts.

Calling attention now to Figure 4, attention is called to an automatic safety feature which prevents breaking or damaging of the gearing and paddle assembly or agitating means. It will be observed that the beveled gear 28 is slidably keyed (in any satisfactory manner not shown) on the shaft 27. Moreover a coiled spring 28a surrounds this shaft, bearing at its lower end against the underneath sprocket wheel and its upper end against the underneath side of the beveled gear 28. This provides an automatic safety release clutch feature. This is found to be necessary since when the ice cream freezes to an almost solidified mass, the paddles will be stopped in their movement or travel. The result is that notwithstanding this, the spring supported beveled gear 28 will release itself sufficiently from the driving pinion 29 to allow the parts to ratchet over each other and avoid the possibility of breakage.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described the invention, what is claimed as new is:

1. In a structure of the class described, a pan having bearing means at its bottom, a removable cover for said pan having bearing means corresponding to the first named bearing means, vertical shafts mounted for rotation in the respective bearing means, sprocket wheels on said shafts, an endless sprocket chain trained over said sprocket wheels, power supply means for operating one of said shafts, and dasher units attached to the sprocket chain, each dasher unit including upper and lower substantially horizontally disposed properly pitched agitating blades, and a vertical scraping paddle pivotally attached to the outer ends of said blades.

2. In a structure of the class described, a pan, a horizontally disposed endless sprocket chain mounted for rotation in said pan, and a dasher unit, said unit comprising a lower horizontally disposed twisted blade, an upper twisted blade disposed above the lower blade and arranged at an acute angle, a connecting web between corresponding ends of said upper and lower blades, said web being attached to the conveyor chain, and a vertical paddle pivotally attached to the outer ends of the upper and lower blades, and disposed in a position substantially oblique to the approximate longitudinal axes of said upper and lower blades.

3. In a structure of the class described, an ice cream making pan, vertically disposed longitudinally spaced shafts mounted for rotation in said pan, an endless sprocket chain operatively connected with said shafts and disposed in parallelism above the bottom of the pan, dasher units attached to said sprocket chain for cooperation with the wall of the pan, a coiled spring surrounding one of said shafts, a beveled gear slidably keyed on said shaft and resting on said coiled spring, a power supply shaft disposed at right angles to said spring equipped shaft and provided with a beveled gear meshing with said first named gear in the manner and for the purposes described.

4. In a structure of the class described, a pan having a pair of centrally disposed longitudinally spaced bearings in its bottom, a removable cover for said pan having a pair of companion correspondingly located bearings, a pair of vertical shafts mounted for rotation in the respective bearings, sprocket wheels carried by said shafts, an endless sprocket chain trained over said sprocket wheels, power supply means for operating one of said shafts, and duplicate dasher units attached at spaced points to the sprocket chain, each unit including a vertical scraping paddle disposed in a position to move in an orbital path within the pan in close proximity to the inner surface of the rim thereof, and means for pivotally attaching the blade to the chain.

5. In an ice cream making structure of the class described, a pan including a removable lid, the bottom of the pan and said lid being provided with complemental bearings, a pair of longitudinally spaced vertically disposed shafts mounted in the bearings, sprocket wheels attached to said shafts in close proximity to the bottom of the pan, an endless sprocket chain trained over said sprocket wheels, dasher units including agitating blades connected to said chain, said blades being disposed to move in an orbital path within the pan in close proximity to the rim and being substantially parallel to said shafts, a power supply shaft mounted for rotation in one end of the pan and provided with a beveled power transmission gear, said gear being disposed in close proximity to one of the aforementioned vertical shafts, and a spring pressed pinion on said last-named vertical shaft releasably engageable with said beveled gear designed to relieve the dasher unit of undue strain and stress and to avoid breakage of the chain as described.

6. As a component assembly of an ice cream dasher construction of the class described, an endless chain adapted to be trained over supporting and operating sprockets, and a dasher unit comprising a lower horizontally disposed tilted blade, a companion substantially correspondingly tilted upper blade disposed at an approximate acute angle to the lower blade, means connecting said blades together at corresponding ends and to said chain, comprising a relatively long vertical panel pivotally attached to the corresponding outer ends of said upper and lower blades, said vertical panel being disposed in a somewhat oblique position in relation to the longitudinal axes of said blades in the manner and for the purposes described.

JAMES E. COLEGROVE.